United States Patent Office 3,010,056
Patented Nov. 21, 1961

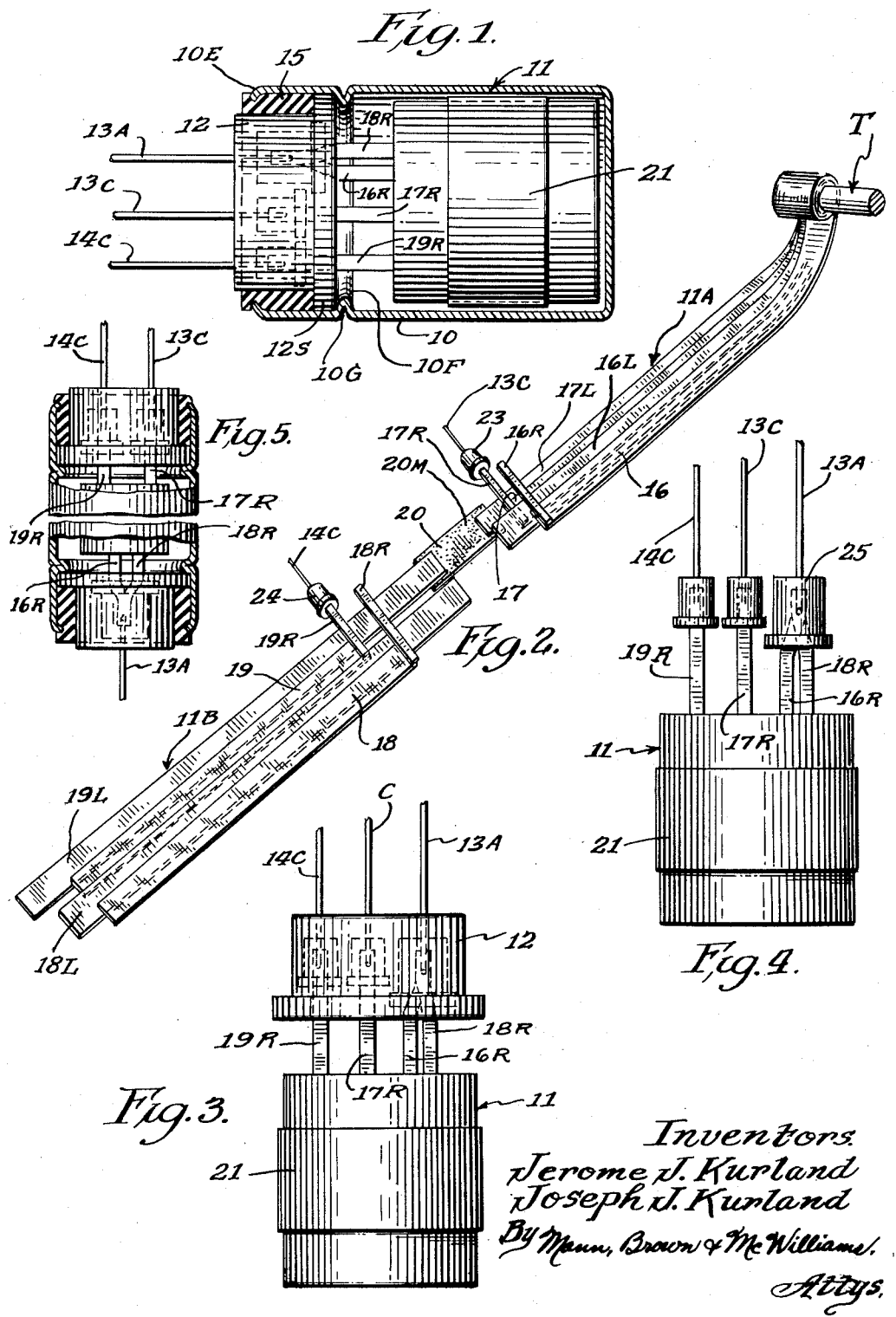

3,010,056
MULTIPLE-TERMINAL MINIATURE CAPACITOR
AND METHOD OF MAKING SAME
Jerome J. Kurland, Chicago, and Joseph J. Kurland, Glencoe, Ill., assignors to Illinois Condenser Company, a corporation of Illinois
Filed Dec. 5, 1958, Ser. No. 778,494
7 Claims. (Cl. 317—230)

This invention relates to capacitors and, more particularly, is concerned with miniature capacitors of the electrolytic type and has for its principal object the provision of a multiple-terminal miniature electrolytic capacitor having multiple-capacitor sections electrically interconnected by a common anode terminal, with the individual capacitor sections being wound in successive concentric relation to form a unitary pack and being insulated from each other by an intermediate strip of insulation arranged concentrically with the capacitor sections of the pack.

Another object of the invention is to provide a multiple-terminal miniature capacitor wherein a plurality of terminals are grouped within a common cap structure in the form of an encapsulation bead.

A further object of the invention is to provide a method for fabricating such a multiple-terminal miniature capacitor wherein individual small-sized encapsulation beads are initially formed on at least some of the terminals and subsequently are integrated into the common encapsulation bead.

Other objects and advantages will become apparent during the course of the following description.

In the accompany drawings forming a part of this specification and in which like numerals are employed to designate like parts throughout the same:

FIG. 1 is an enlarged longitudinal sectional view through a multiple-terminal miniature capacitor constructed in accordance with this invention;

FIG. 2 is a perspective view, with parts broken away and sectioned, illustrating the novel construction and arrangement of the capacitor pack, with the pack illustrated in a partially wound condition;

FIG. 3 is a side-elevational view of the capacitor pack after winding thereof and after formation of and encapsulation of the juncture for the common anode terminals;

FIG. 4 is a side-elevational view of a complete subassembly that includes the capacitor pack, the cap structure, and the external terminals ready for final processing and testing prior to mounting thereof within the capacitor casing; and FIG. 5 is a longitudinal sectional view through an alternative embodiment of a muliple-terminal miniature capacitor constructed in accordance with this invention.

Referring now to the drawings, for purposes of disclosure the invention is illustrated in connection with the fabrication of a miniature type multiple-terminal electrolytic capacitor that is shown in its completed form in FIG. 1 as comprising a hollow, open-ended, tubular casing 10 that is here shown in the form of a cylindrical, metallic can that may have a wall thickness on the order of .008" to .015", a multiple-section capacitor pack 11 of novel form and suitably saturated with electrolyte, a plurality of external connection terminals, of which 13C and 14C are cathode terminals for the two sections of the pack and terminal 13A is an anode terminal common to both sections of the pack, and a common cap structure for the terminals in the form of a solid, molded encapsulation bead 12 that is here shown in association with a sleeve-like sealing gasket 15 of suitable rubber or rubber-like material with the end edge 10E of the sidewalls of the casing being bent over to project radially inwardly and compress the gasket 15 against the encapsulation bead.

In the fabrication of the capacitor of FIG. 1, resort may be had to the general techniques and equipment illustrated in our copending application, Serial No. 664,-537, filed June 10, 1957, the disclosure of which, to the extent it is not inconsistent herewith, is specifically incorporated by reference. In accordance with the teachings in this copending application, each capacitor foil is provided with a riser in the form of an aluminum strip that is connected to an external terminal, which may be a tin-coated copper or brass wire with the riser and wire preferably being spot-welded at the juncture of the dissimilar metals.

The novel multiple-section miniature capacitor pack construction is illustrated in FIG. 2 as comprising separately formed sections 11A and 11B wound in successive concentric relation to form a unitary pack. The pack is shown in its initial phase of formation wherein section 11A, which is shown partially wound about a suitable winding tool T, comprises anode and cathode foils of aluminum or similar material, designated 16 and 17 respectively, alternately interleaved with layers of insulation 16L and 17L, which may be of paper or other suitable material, with the arrangement of layers being stacked in direct overlapping relation for formation into a consolidated cylindrical pack.

The second section 11B of the pack is similarly constructed and is comprised of anode and cathode foils, designated 18 and 19 respectively, alternately interleaved in direct overlapping relation with suitable layers of insulating paper 18L and 19L and being joined to the first capacitor section by a lengthwise strip of electrical insulation 20 that is sufficiently long to form at least one complete layer or turn in the pack for isolating the two sections of the capacitor to prevent leakage or other electrical interaction therebetween. This particular arrangement wherein the foils are successively wound in separate concentric capacitor sections that are electrically isolated by a full turn of insulation offers important advantages over prior art constructions in that there is a more effective and reliable separation of the capacitor sections and the parts are more compact and easier to handle and assemble.

In the preferred constructional embodiment, the layer 20 of insulation is a full turn or more of pressure-sensitive adhesive tape of an acetate or Mylar base. The tape has its opposite ends fixed to the adjacent ends of the outermost insulation layers 17L and 19L of the capacitor sections. The midlength portion 20M of the pressure-sensitive tape is exposed so that as the winding of the pack proceeds, this exposed length of tape will contact and adhere to the outermost layer of the first section of the capacitor to secure the first section in tightly wound condition. After the second section is completely wound, a band 21 of any suitable adhesive tape (see FIG. 3) is applied to secure the pack.

It should be understood that while a pressure-sensitive adhesive tape is preferred for the intermediate turn 20 since this facilitates the winding operation, the invention also contemplates the use of a pure strip of insulation without adhesive.

As is apparent from a consideration of FIG. 2, junctures between the cathode risers 17R and 19R and the cathode terminals 13C and 14C may be formed prior to the winding operation and also may be provided with suitable solid encapsulation beads 23 and 24 prior to winding of the pack and this protects these junctures during the actual winding operation. In fact, it is preferred that these junctures be formed and encapsulated prior to staking the risers to their respective foils. There is advantage in the procedure in that the formation of the encapsulation beads is most easily carried out immediately following the formation of the juncture and before the riser is attached to its associated foil. In addition, the bead immediately isolates the juncture from chemical attack and provides mechanical strength and rigidity to simplify subsequent handling procedures.

After the winding of the capacitor pack is completed, the risers 16R and 18R of each of the anode foils are joined to the common anode terminal 13A, and in the preferred practice of this invention, the juncture between the anode risers and the common anode terminal is immediately provided with an individual solid encapsulation bead 25 that completely surrounds the juncture to isolate it from chemical attack and provide it with desired mechanical strength and rigidity.

With the capacitor completely wound and with the protection beads formed individualy for each juncture, as is indicated in FIG. 3, the entire group of junctures may readily be integrated into a common encapsulation bead 12 (see FIG. 3) to form a solid, one-piece multiple-terminal cap structure. The handling of the individual risers and terminals necessary to ensure maintaining electrical clearance therebetween is greatly facilitated by the presence of the individual beads that protect the fragile junctures and also function as insulated spacers that help to maintain required clearances.

This technique of encapsulating individual protection beads for each juncture for subsequent integration into one common bead is applicable to other capacitor arrangements that have multiple-terminal cap structures and represents an important advance in the art of fabricating miniature capacitors. While in the arrangement illustrated in the present disclosure, it is preferred to form an individual protection bead for all of the junctures, it will be apparent that, in some instances, beads on only some of the junctures may suffice to accomplish the desired protection and clearance.

The material for molding the individual protection beads and the common encapsulation bead may be the same if desired. Any dielectric material that can be cast and that is resistant to air and moisture and to chemical attack in the presence of various types of electrolytes is suitable. Certain resins, for example, are available for this use: the epoxy resins, the polyester resins, and phenol and condensation resins.

Other desirable properties which the encapsulation material preferably should possess are high tensile and shock strength, excellent insulation resistance, stability at high temperatures, and stability in the presence of the various capacitor fill materials and any other materials that are employed in the fabrication of the capacitor. One or more of these last-mentioned properties may or may not be required, depending upon the particular application, as will be apparent to those skilled in this art.

While it is preferred that the encapsulation beads be formed of hard, incompressible material, it will be apparent to those skilled in the art that in certain instances the beads may be cast of rubber or rubber and plastic compounds and similar materials.

The complete subassembly comprising the capacitor pack 11 and the multiple-terminal cap structure having the solid one-piece encapsulation bead 12 and the external terminals, as shown in FIG. 3, now forms a convenient unit that may be finally processed by appropriately saturating it in a suitable electrolyte and then testing it prior to its actual insertion in the casing. During this processing and testing the risers and terminals are adequately spaced apart and protected and the unit is readily capable of withstanding the usual shocks incident to handling. There is additional advantage in that if testing indicates need for additional soaking in electrolyte, this may be remedied immediately without requiring any disassembly and without involving any waste of material.

The completed capacitor is shown in FIG. 1, wherein the unit assembly has been inserted in the metallic can 10 that is formed with an endless score groove 10G to provide an annular internal flange 10F that serves to locate the solid encapsulation bead 12, which is provided with a peripheral shoulder 12S for this purpose. As the end of the can is bent in against the sleeve, compression is set up radially against the outer end of the encapsulation bead and also longitudinally to grip the shoulder 12S of the encapsulation against the internal flange 10F and hold the cap structure rigidly in place within the can. This maintains a proper hermetic seal throughout the life of the capacitor and avoids crushing of the capacitor pack.

In the foregoing discussion, the invention was disclosed in connection with a capacitor of the upright type wherein all of the terminals are brought out the same end through a common cap. It will be apparent, however, that the principles of the invention are equally applicable to capacitors of the tubular type such as is shown in FIG. 5. These tubular type capacitors have the two negative terminals brought out one end and the common positive terminal brought out the other end, and since the method of fabrication and the actual components are in all general respects identical, identical reference characters have been employed in designating the parts of the tubular capacitor.

Many of the techniques and sequence of fabrication steps explained previously are applicable to larger-size capacitors; and the invention, in its broader aspect, contemplates the manufacture of larger-size capacitors of the multiple-terminal common positive type. It should be noted that in the case of larger-size capacitors, it frequently is not inconvenient to form the junctures between the terminal leads and the risers after the winding operation is completed. Similarly, with reference to the larger-size capacitors, the advantages of individually encapsulated junctures become less important and a plurality of junctures may be encapsulated simultaneously in a common enlarged bead.

While the invention has been described in relation to miniature capacitors of the electrolytic type, its application to other types of capacitors, such as electrostatic, wax or oil-impregnated, or other comparable devices will be apparent to those skilled in this art.

It should be understood that the description of the preferred form of the invention is for the purpose of complying with section 112, Title 35, of the U.S. Code and that the claims should be construed as broadly as prior art will permit.

We claim:

1. A multiple-section common anode capacitor comprising a casing having an open end, a wound unitary pack disposed in the casing and having a plurality of separate external cathode terminals and a common external anode terminal projecting through the open end thereof, electrolyte impregnating said pack, and a cap structure hermetically sealing the open end of said casing with said external terminals projecting through said cap structure wherein said capacitor pack consists of a plurality of separate capacitor sections wound in endwise spaced successive concentric relation with a strip of insulation between adjacent ends of said sections and arranged concentrically within the pack to form at least one spiral layer therein constituting the sole electrical insulation barrier sealed upon itself to provide an electrical insulation barrier for electrically isolating said sections, said strip being of a material that is electrically insulating and impervious to electrolyte and said layer being of a width to overlie and contact substantially the entire radially oppositely facing surfaces of said sections that are adjacent thereto, each section comprising upper and lower insulation layers and anode and cathode foils in alternating overlying relation therewith to form an individual stack, with the anode foils of the stacks being spaced apart to lie on opposite sides of said spiral layer and having individual risers connected to said common anode terminal at a point internally of said casing and with the cathode foils of the stacks having individual risers connected to individual ones of said cathode terminals and with said casing being empty of electrolyte material capable of establishing electrolyte leakage paths between said separate capacitor sections externally of said pack.

2. The capacitor of claim 1 wherein said strip of insulation is pressure-sensitive adhesive tape having opposite ends thereof adhered to adjacent ends of the bottom insulation layers of adjacent sections.

3. In a capacitor having a concentrically wound multiple section pack of the type having conventional separating strips of insulating material interleaved with conventional electrode foils, said strips having electrolyte impregnated therein to maintain said electrolyte in effective electrical coupling relation with the foils throughout the areas thereof engaged by said strips and thereby provide capacitively coacting anode and cathode elements: the combination of a pack having a first separate wound capacitor section of spiral configuration, an electrical insulating barrier comprising a full turn of imperforate material disposed concentrically in said pack and in encircling relation about said first section and sealed upon itself, said material being electrically insulating and impervious to electrolyte and said turn being of a width to overlie and contact substantially the entire peripheral outermost surface of said first wound section, and a second separate wound capacitor section of spiral configuration and disposed in concentric encircling contacting relation around said barrier, with said barrier blocking electrolyte leakage paths between said separate capacitor sections internally of said pack, a casing for said pack, said casing being empty of electrolyte material capable of establishing electrolyte leakage paths between said separate capacitor sections, externally of said pack, means for hermetically sealing said pack in said casing, and connector terminals for said first and second capacitor sections projecting from said casing through said sealing means.

4. The arrangement of claim 3 wherein said barrier is comprised of a length of pressure sensitive tape having opposite end portions adhered to adjacent ends of a separating strip from each section and having its intermediate length adhered around the outermost peripheral surface of said first section.

5. In a multiple section common electrode capacitor having a concentrically wound multiple section pack of the type having conventional separating strips of insulating material interleaved with conventional electrode foils, said strips having electrolyte impregnated therein to maintain said electrolyte in effective electrical coupling relation with the foils throughout the areas thereof engaged by said strips and thereby provide capacitively coacting anode and cathode elements: the combination of a first separate wound capacitor section of spiral configuration, an electrical insulating barrier comprising a full turn of imperforate material disposed concentrically in said pack and in encircling relation about said first section and sealed upon itself, said material being electrically insulating and impervious to electrolyte and said turn being of a width to overlie and contact substantially the entire peripheral outermost surface of said first wound section, a second separate wound capacitor section of spiral configuration and disposed in concentric encircling contacting relation around said barrier, with said barrier blocking electrolyte leakage paths between said separate capacitor sections internally of said pack, a casing for said pack, said casing being empty of electrolyte material capable of establishing electrolyte leakage paths between said separate capacitor sections externally of said pack, means for hermetically sealing said pack in said casing, separate terminals connected to each foil of one element type and projecting from said casing through said sealing means, separate risers connected to each foil of the other element type and interconnected internally of said casing, and a common terminal electrically connected to said risers and projecting from said casing through said sealing means.

6. In a multiple section common electrode capacitor having a concentrically wound multiple section pack of the type having conventional separating strips of insulating material interleaved with conventional electrode foils, said strips having electrolyte impregnated therein to maintain said electrolyte in effective electrical coupling relation with the foils throughout the areas thereof engaged by said strips and thereby provide capacitively coacting anode and cathode elements: the combination of a first separate wound capacitor section of spiral configuration, an electrical insulating barrier comprising a full turn of imperforate material disposed concentrically in said pack and in encircling relation about said first section and sealed upon itself, said material being electrically insulating and impervious to electrolyte and said turn being of a width to overlie and contact substantially the entire peripheral outermost surface of said first wound section, a second separate wound capacitor section of spiral configuration and disposed in concentric encircling contacting relation around said barrier, with said barrier blocking electrolyte leakage paths between said separate capacitor sections internally of said pack, a casing for said pack, said casing being empty of electrolyte material capable of establishing electrolyte leakage paths between said separate capacitor sections externally of said pack, means for hermetically sealing said pack in said casing, separate terminals connected to each cathode foil and projecting from said casing through said sealing means, separate risers connected to each anode foil and interconnected internally of said casing, and a common anode terminal electrically connected to said risers and projecting from said casing through said sealing means.

7. The arrangement of claim 6 wherein said barrier is comprised of a length of pressure sensitive tape having opposite end portions adhered to adjacent ends of a separating strip from each section and having its intermediate length adhered around the outermost peripheral surface of said first section.

References Cited in the file of this patent

UNITED STATES PATENTS

| | | |
|---|---|---|
| 1,694,927 | Rice | Dec. 11, 1928 |
| 2,099,797 | Clark | Nov. 23, 1937 |
| 2,113,126 | Baer | Apr. 5, 1938 |
| 2,224,307 | Linder | Dec. 10, 1940 |
| 2,288,157 | Dunleavey | June 30, 1942 |
| 2,309,563 | Abeel | Jan. 26, 1943 |
| 2,862,155 | Bubriski | Nov. 25, 1958 |
| 2,884,575 | Lilienfeld | Apr. 28, 1959 |
| 2,926,109 | Lilienfeld | Feb. 23, 1960 |